United States Patent Office 3,759,683
Patented Sept. 18, 1973

3,759,683
PROCESS FOR THE MANUFACTURE OF MULTI-COMPONENT SUBSTANCES
Helmut Dislich, Mainz-Gonsenheim, Paul Hinz, Mainz-Mombach, and Reinhard Kaufmann, Mainz, Germany, assignors to JENAer Glaswerk Schott & Gen., Mainz, Germany
No Drawing. Filed July 30, 1970, Ser. No. 59,669
Claims priority, application Germany, Aug. 13, 1969, P 19 41 191.1
Int. Cl. C03b *5/16;* C03c *13/00;* C03g *3/22*
U.S. Cl. 65—134
25 Claims

ABSTRACT OF THE DISCLOSURE

Glassy, crystalline, or glassy crystalline oxidic multi-component substances, which are transparent, are produced without going through a molten phase. An alkali or alkaline earth metal compound and at least one other metal compound, both dissolved in an organic solvent, are reacted in the solvent, the solvent is evaporated to form a precipitate, and the precipitate is heated to form the multi-component substance.

BACKGROUND

The invention relates to a process for the manufacture of glassy, crystalline or glassy-crystalline multi-component systems without recourse to melting.

Among the transparent multi-component substances known, glasses are the most important. Multi-component glasses are manufactured according to prior art methods by melting, i.e., at temperatures far above the transformation range, at viscosities usually ranging from about $10^2$ to about $10^3$ poises. Not until this range of temperatures and viscosities is reached can the individual components of the mixture (usually oxides) react with one another in the manner necessary for the formation of glass. Sometimes the temperatures required for the attainment of the above-stated viscosity range are so high that they threaten to make the melting process impractical.

There is no known process for making glasses at substantially lower temperatures—temperatures in the transformation range, let us say.

Transparent coatings made by known methods may consist of individual oxides or mixed oxides. Such processes start with a hydrolyzable compound which is deposited out of a solvent onto the support where it is hydrolyzed and transformed to an oxide layer by raising the temperature. In this manner, $SiO_2$ and $TiO_2$ coatings are prepared without passing through the molten phase. In the preparation of mixed-oxide coatings, the process is limited to those elements which individually form oxides that are resistant to their surroundings—i.e., to air, as a rule, with its ordinary moisture content. No method has become known for introducing, say alkali oxides or alkaline earth oxides into such layers or coatings.

Nevertheless, the introduction of alkali oxides and alkaline earth oxides, which are known to be glass transforming agents, would signify an important technical advantage, since it would diminish the tendency of such layers to devitrify, which is often triggered by components of the support, and it would also lead to a denser composition in such layers, also due to the fact that heating can then be carried up to the transformation range so that the layers can arrange themselves and densify. The individual oxide and mixed oxide layers, however, have their transformation ranges at such high temperatures that as a rule they cannot be heated up to this range because their supporting materials cannot withstand these temperatures.

The preparation of homogeneous mixtures, for example as starting materials for hydrothermal syntheses, is in the prior art. In this procedure hydroxides are precipitated together at certain pH values, but this yields nothing but mixed hydroxides from which definite glasses (glasses of definite composition) cannot be obtained without passing through the molten phase, or else nitrates are calcined all together and the same thing can be said. According to the prior art, nitrates of other metals are added to alcoholic solutions of silicic acid ethyl ester and the solutions are hydrolyzed with water, whereupon $SiO_2$ precipitates as a gel. Calcining follows, in order to decompose the nitrates. This method, too, produces nothing but mixtures. The use of other organometallic compounds is described, such as aluminum isopropylate, triethanolamine titanate, and tetrabutyl titanate. The only advantage of these compounds is stated to be that the heating does not need to be as high as it does with the nitrates. Alkali alcoholates and alkaline earth alcoholates are not mentioned. Alkali is added in the form of carbonate or hydroxide before the hydrolysis, and the cations are simply absorbed into the gel, thus preventing separate crystallization. In the processes known hitherto, therefore, mixtures are always produced from which no definite glassy, crystalline or glassy-crystalline oxidic multi-component solids are obtained without passing through the molten plase. In particular, it is not possible by these methods to apply, for example, glassy coatings to substrates.

Summing up, it can be said that no general process that is applicable to many elements has been made known whereby transparent oxidic multi-component materials can be made at temperatures far below the melting temperature.

THE INVENTION

The invention concerns a general process for the preparation of glassy, crystalline or glassy-crystalline, oxidic multi-component substances, which are or may be transparent, without passing through a molten phase, characterized in that alkali compounds and/or alkaline earth metal compounds that are soluble as solutes in organic solvents are dissolved in organic solvents; other metal compounds of Groups I-B, II-B, III, IV, V, VI, VII-A or VIII of the Periodic System (Mendelyeev) which are soluble as solutes in organic solvents are dissolved in organic solvents; the alkali or alkali earth metal compounds are reacted with the metal compounds of said Groups I-B to VIII in organic solution, so that a homogeneous solution containing the reaction product is formed; then solvent is evaporated in the presence of moisture leaving a residue and finally heating the residue to temperatures below the melting point or melting range of the reaction product.

The alkali compounds or alkali earth metal compounds are preferably used as alcoholates or in a form such that they form alcoholates in solution or form alcoholate complexes with one another in the solution. Of the said other metal compounds, $P_2O_5$, $As_2O_3$ and $H_3BO_3$ are examples of preferred materials; other preferred compounds are disclosed in the examples, infra. Alkali and alkali earth metal compounds which can be used, as preferred embodiments, are lithium, sodium, potassium, and calcium and barium; other of said other metal compounds, being preferred embodiments, are magnesium, boron, titanium, silicon, phosphorus, aluminum, zirconium, lead, and zinc. As used herein, "alkali earth metal group" includes magnesium, calcium, strontium and barium.

By the process according to the invention, transparent multi-component substances are obtained even at temperatures that are far below the melting temperature of the substance in question. This is due to the fact that, on account of their reactivity, the components form compounds with one another while in the solvent and during the heating that follows. An example of this is the following reaction:

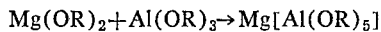

wherein the soluble magnesium aluminum alcoholate complex compound forms from magnesium alcoholate and aluminum alcoholate in an alcoholic solution (Houben-Weyl: "Methoden der organischen Chemie," vol. VI/2, part 2, page 31, Georg Thieme Verlag Stuttgart, 1963). This complex compound is further processed according to the invention (Example 8) to form spinel. Molecular residues are hydrolytically and/or pyrolytically split off from these compounds with the formation of the transparent multi-component substances, thereby eliminating the necessity of high temperatures. The transparent multi-component substances may be of a glassy, crystalline or glassy-crystalline nature.

In case of the formation of multi-component glasses, the temperatures that are needed are temperatures in the transformation range of the glasses or lower, and hence they are far below the usual melting temperature. In the case of the preparation of a borosilicate glass, this temperature amounts, for example, to 560° C. The invention therefore contains a new and general principle for the making of glasses without melting.

If a multi-component glass is to be produced, the mixing ratio of the individual components is so selected that the mixture ratio of the resulting oxides is in the known glassy region of the multi-component system in question. If a crystalline phase is to result, the mixing ratio of the individual components is chosen accordingly. If a partly glassy, partly crystalline system is to result, such as a ceramic glass for example, the mixing ratio is made to correspond to a ceramic glass and the mixture preferably contains nucleating agents, so that at first an exclusively glassy system develops, which by an appropriate temperature program is brought to partial crystallization.

It is possible that, just as it happens in the melting of a glass, a partial volatilization of one of the components may produce a shift in the mixture ratio, and allowance is made for this in preparing the mixture.

The process of the invention is especially suited for making coatings on substrates, though it is also possible to produce coarse grains or lumps of the transparent multi-component substance. The process can be performed in the following manner: Inter-reacting individual compounds of the desired multi-component substances are put successively into a solvent and dissolved. Alcohols, particularly lower aliphatic alcohols such as $C_1$-$C_4$ alkanols, are preferred as solvents, although other organic solvents, such as ketones, esters and mixtures of ketones and esters, and mixtures of same with water, can be used. The individual components are introduced preferably, though by no means exclusively, in the form of alcoholates. If desired, $H_3BO_3$, phosphorus pentoxide or arsenic pentoxide can be used. In addition to the alcoholates of elements from higher groups of the periodic system, such as those of silicon, titanium, zirconium, aluminum or lead, those of the first two main groups are to be emphasized, such as the alcoholates of lithium, sodium, potassium, maganesium, calcium and barium. In the case of the production of glasses, the process of the invention thus permits the introduction of virtually any glass formers, and particularly of glass transforming agents. Since even while these starting solutions are being made ready a reaction takes place between the individual components, to produce soluble complex compounds for example, the order in which they are added is important. By a few preliminary experiments it is possible to determine what the sequence should be to prevent premature precipitations. In many cases, stabilizers, e.g., chelating agents, such as acetylacetone or triethanolamine, are added. The balance of the process varies according to whether thin coatings on substrates or granular materials are to be made.

In the case of thin coatings, the bodies to be coated are dipped in the solution and withdrawn at a uniform rate. In the case of granular materials, the solution can be slowly evaporated in the presence of moisture to leave as a residue a thick body, e.g., a gel. Then it is gradually heated to temperatures that are far below the melting temperature of the transparent multi-component substance—preferably to temperatures in the transformation range in the case of glasses. The reactions that take place are primarily of a hydrolytic nature, and possilbe also of a pyrolytic nature in part. Water can be added to the solution, and in particular it can be taken from the moisture in the ambient air. In this manner, reaction products such as alcohols and hydrogen chloride can be cleaved from the complex compounds that are formed. The multi-component substances solidify by polycondensation reactions, also with the yielding of water, and they become increasingly insoluble until, at elevated temperature, all of the "helper radicals" that were the cause of the high reactivity have been split off and all that is left is the transparent multi-component substance. In the case of glasses we are confronted by the hitherto unknown circumstance that, owing to a cross-linking reaction of multi-functional compounds by the methods of organic chemistry, insoluble polycondensates are first produced which, after removal of the last "helper radicals," become a thermoplastic substance, namely glass.

The advantages of the process of the inveniton are:

(1) The process permits the making of glasses of the prior art at lower temperatures than ever before possible.

(2) The process permits the application of glass coatings of virtually any desired composition.

(3) These glasses can be used to coat even those substrates, such as other glasses or metals, whose softening temperatures are lower than the melting temperatures of the glasses applied to them.

(4) The invention permits the utilization of the chemical, optical, electrical and mechanical properties known in the same glasses prepared by melting, in thin coatings. For example, sensitive glasses can be provided with chemically resistant protective coatings. This is of special value in glasses whose optical properties have been highly cultivated at the expense of their chemical stability, i.e., weathering resistance.

(5) The process avoids, on the basis of the low temperature, all of the disadvantages which the common melting process suffers on account of the high temperature, such as the expense involved in producing this high temperature, the attacking of the tanks and crucibles, and the danger of devitrification at high temperature, to name but a few.

(6) The process also permits the making of glass systems which heretofore could not be made at all on account of the difficulties mentioned under 5, which the melting process entailed. In the case of a glass that has been impossible to make on account of its devitrification tendency in the molten state, molded objects can be made by heating the glass lumps to temperatures at or just above the transformation temperature and pressing them at this temperature.

(7) The process is very general in regard to variability in the composition of the transparent multi-component substances being prepared, because easily variable parameters are available in the solvent, in the nature of the substitution of the elements to be put in and hence in their reactivity, solubility and hydrolyzability and pyrolyzability, whereby the process can be controlled without their having an effect on the end product.

(8) The transformation range can be varied within wide limits by changing the nature and quantity of the individual components. For example, coatings having relatively low transformation temperatures can be deliberately produced, which is not the case, as a rule, with individual oxides or mixed oxides. Such coatings can arrange themselves and densify when they are heated in the transformation range.

(9) Optical, chemical, mechanical or electrical characteristics of the glasses can be tailored to requirements within wide limits without great expense.

(10) Coatings according to the invention can be applied to metals which can thus be insulated electrically.

(11) Coatings according to the invention prevent or inhibit the scaling of metals, such as iron and brass, at elevated temperature, and they prevent the corrosion of brass.

(12) Coatings according to the invention, having a composition corresponding to a common glass ceramic, can be transformed, like the corresponding melted glass ceramic, to the glassy-crystalline state by a heat treatment.

(13) Coatings according to the invention can be applied to substrates whose softening point is higher than that of the coatings, and then the coating can be fused onto the substrate.

EXAMPLE 1—BOROSILICATE GLASS

Preparation of the solution

The following were put successively into a three-necked flask provided with stirrer and reflux condenser, with stirring and flooding with nitrogen:

50 g. ethanol (dry)+0.5 g. acetyl acetone
102 g. $Si(OCH_3)_4$
5.3 g. $Al(O\ sec.\ C_4H_9)_3$
10.5 g. $NaOCH_3$ (sol. in methanol corr. to 172 g. $Na_2O$ per liter)
1.4 g. $KOC_2H_5$ (sol. in ethanol corr. to 218 g. $K_2O$ per liter)

The precipitate that forms when the aluminum secondary butylate is added is dissolved by stirring with heating at 70° C. Thereafter, 11.2 g. of $H_3BO_3$, dissolved in 120 ml. of boiling ethanol, is added. The precipitate that forms dissolves in 15 minutes. The solution has a dark yellow color and contains the compounds in the following ratio, calculated as oxides:

| | Percent |
|---|---|
| $B_2O_3$ | 12.7 |
| $SiO_2$ | 80.6 |
| $Na_2O$ | 3.6 |
| $Al_2O_3$ | 2.2 |
| $K_2O$ | 0.6 |

The total oxide content of the solution amounts to about 160 g. per liter. With the exclusion of atmospheric moisture the solution is stable.

Preparation of thin coatings

The solution is diluted with ethanol and acetyl acetone to 30 g. total oxide per liter and 20 g. acetyl acetone per liter. A cvoer glass is immersed in it and withdrawn in ambient air at a rate of 5 cm. per minute (at 22° C. and 6 g. moisture per m.³), whereupon hydrolysis and some evaporation occurs, leaving a residue, and then the residue is heated at about 40° C./min. to 560° C. and is held at 560° C. for about 15–30 minutes. At the concentration of 30 g. total oxide per liter the thickness of the single coat is of the order of magnitude of 100 to about 600 A. To obtain thicker coatings, the boron trioxide concentration can be increased to 18%, for example, thus making possible the application of transparent coatings at a concentration of 80 g. total oxide per liter. Coatings made in this manner have thicknesses of the order of 1000 to about 5000 A. The thickness can be further increased by repeated coating and by increasing the viscosity of the solution, which is achieved by hydrolyzation.

Properties of the coatings

The coating is clear and transparent and steel scriber-proof. The infrared spectrum gives the typical curve of a borosilicate glass.

Metals can be electrically insulated with thicker coatings (repeated coating). These coatings prevent or inhibit at the same time the scaling of metals, of iron for example. An iron plate thus coated does not scale when it is heated for 3 hours at 800° C. An uncoated iron plate is completely covered with scale under such severe conditions. The tarnishing of brass is also prevented. An untreated brass plate rapidly tarnishes at 530° C., while a coated one retains its bright surface.

Preparation of glass lumps

The dilute solution containing 30 g. total oxide per liter is let stand in a glass beaker exposed to ambient moist air for 24 hours. Hydrolysis and some evaporation occur and the medium stiffens to a jelly-like mass, which is then slowly heated (at a rate of about 40° C./min.) to 150° C. and is held at 150° C. for about 9 hours. Thereupon it becomes fissured and breaks up into small yellow lumps. When these lumps are heated at a rate of about 40° C./min. to 530° C. and held at 530° C. for 24 hours, colorless, glass-clear lumps are obtained.

Properties of the lumps

The lumps are so hard that they scratch cover glass and No. 20 apparatus glass. Their chemical composition is:

| | Percent |
|---|---|
| $SiO_2$ | 86.85 |
| $B_2O_3$ | 5.91 |
| $Al_2O_3$ | 2.62 |
| $Na_2O$ | 3.92 |
| $K_2O$ | 0.66 |

The infrared spectrum (in KBr) corresponds to that of a borosilicate glass. The lumps are amorphous according to X-ray examination. The index of refraction is $n_D=1.477$ and the Abbe number is $\gamma_D=65$. The viscosity characteristics, in the temperature range up to 800° C., correspond to those of a borosilicate glass.

For further measurements the lumps were compressed into molded bodies at 630° C. and 100 metric tons pressure. These bodies have a density $D_{20°\,C.}=2.28$ g./cm.³, a coefficient of expansion $\alpha_{20-300}$ per °C.$=32\cdot 10^{-7}$ per °C., and a transformation point of 590° C. The molded bodies can be obtained in glass-clear form, the temperature being preferably increased to about 650 to 700° C. The residual moisture content is 0.03% $H_2O$, which is the same as that of a borosilicate glass made by melting. The residual carbon content amounts to 0.0002%. The hydrolytic resistivity is the same as that of melted borosilicate glasses.

Lumps fused at 1600° C. have a density $D_{20}$ of 2.27 g./cm.³ and an index of refraction $n_D$ of 1.474; Abbe number $\gamma_D=65$; expansion coefficient$=32\times 10^{-7}/°$ C.; transformation temperature 610° C. This glass is identical to conventional molten glass.

EXAMPLE 2—PHOSPHATE-SILICATE GLASS

Preparation of the solution

The following were placed, in the order given, in a three-necked flask provided with stirrer and reflux condenser, with stirring and with flooding with nitrogen.

| | Percent |
|---|---|
| Ethanol | 55 |
| Acetyl acetone | 4.5 |
| $Si(OCH_3)_4$ | 13.4 |
| $Al(O\ sec.\ C_4H_9)_3$ | 10.7 |

The mixture is then refluxed for 5 minutes, whereupon the following are added:

1.4 ml. Ba(OC$_2$H$_5$)$_2$ solution (sol. in C$_2$H$_5$OH corr. to 146 g. BaO/l.)
1 ml. Ca(OC$_2$H$_5$)$_2$ solution (sol. in C$_2$H$_5$OH corr. to 70.7 g. CaO/l.)
1 ml. Mg(OCH$_3$)$_2$ solution (sol. in CH$_3$OH corr. to 16.3 g. MgO/l.)
0.4 g. H$_3$BO$_3$ (dissolved in 15 ml. of hot C$_2$H$_5$OH)
0.8 g. P$_2$O$_5$ ⎫
0.01 g. As$_2$O$_5$ ⎬ Dissolved together in 15 ml. C$_2$H$_5$OH The solution is clear, yellow colored, and contains about 80 g. total oxide per liter, the concentration of the oxide being as follows:

| | Percent |
|---|---|
| SiO$_2$ | 60.0 |
| Al$_2$O$_3$ | 25.2 |
| MgO | 0.02 |
| P$_2$O$_5$ | 9.0 |
| B$_2$O$_3$ | 2.6 |
| CaO | 0.78 |
| BaO | 2.3 |
| As$_2$O$_3$ | 0.10 |

As long as atmospheric moisture is excluded the solution is stable.

Preparation of thin coatings

The solution is diluted with ethanol to 50 g. total oxide per liter. A slip of cover glass is partially immersed and withdrawn into ambient (moist) air at a rate of 27 cm./min. and then heated for 15 minutes at 520° C.

Properties of the coating

The coating is glass-clear and steel scriber-proof. In a similar coating on a platinum plate, the following elements were detected qualitatively by means of the microprobe: Si, Al, Mg, P, Ca, Ba, C (B is not detectable by this method). No crystalline phases were found.

In the case of a single coat, the thickness amounts to about 250 m$\mu$. A cover glass half coated was weathered in a weathering chamber; the bare portion of the cover glass was clearly attacked after 144 hours, but not the coated half.

Schott glasses LaK 21, LaK N7 and PSK 51 and an extremely sensitive borate glass were likewise half-coated. LaK 21 and LaK N7 were stabilized against attack by water at 55° C. for 72 hours and against weathering in a weathering chamber. Coated PSK 51 was tested in the weathering chamber and not until after 100 hours did it show deterioration of the coating, while uncoated PSK 51 lost its transparency completely in 30 hours. Similarly applied coatings of SiO$_2$ did not result in any such protective effect on any of these three glasses. The sensitive borate glass was very rapidly attacked in water at 55° C., but when coated it showed no sign of attack after 3 hours of exposure.

Preparation of granular material

A solution containing 30 g. total oxide per liter of ethanol is let stand in a glass beaker exposed to the ambient (moist) air until it stiffens to a jelly-like mass. Then it is heated slowly to 250° C., kept at 250° C. for 12 hours, and then heated for 24 hours at 620° C. The lumps which are obtained, along with a number of dark impurities, are glass-clear, hard and brittle.

If in this example the ethanol is replaced by a 50:50-mixture of ethanol/ethylacetate, ethanol/butylacetate, or ethanol/dimethylketone, the same results are obtained.

EXAMPLE 3—LEAD SILICATE GLASS

Preparation of the solution

The following were placed successively into a three-necked flask provided with stirrer and reflux condenser, with stirring and flooding with nitrogen:

10 g. ethanol
15.7 g. Si(OCH$_3$)$_4$
4.7 g. NaOCH$_3$ (sol. in CH$_3$OH corr. to 172 g. of Na$_2$O per liter)
47.2 g. Pb(OC$_4$H$_9$)$_2$ (sol. in C$_4$H$_9$OH corr. to 68 g. PbO$_2$ per liter)

The solution has a light yellow color and contains the compounds in the following concentration, calculated as oxides:

| | Percent |
|---|---|
| SiO$_2$ | 62 |
| PbO | 30 |
| Na$_2$O | 8 | and the total oxide content of the solution amounts to about 120 grams per liter.

Preparation of thin coatings

The solution is diluted with ethanol to 10 g. total oxide per liter and stabilized with 2% triethanolamine. A piece of cover glass is immersed in it and withdrawn into the ambient (moist) air at a rate of 5 cm. per minute, and then treated for 15 minutes at 450° C.

Properties of the coating

The coating is transparent and shiny. It is steel scriber-proof. Si, Pb and Na were detected qualitatively by means of the microprobe in a coating applied to a slip of platinum.

EXAMPLE 4—COATINGS AND GRANULES CONTAINING EUCRYPTILE

Preparation of the solution

The following were placed successively into a three-necked flask provided with stirrer and reflux condenser, with stirring and flooding with nitrogen:

400 ml. ethanol
2.5 ml. acetyl acetone
54 g. Al(OC$_4$H$_9$)$_3$
36 g. LiOC$_2$H$_5$ (sol. in C$_2$H$_5$OH corr. to 92 grams Li$_2$O per liter)
34 g. Si(OCH$_3$)$_4$ The clear solution obtained has a light brown color and is stable. It contains the oxides in the following molar ratio:

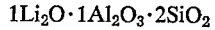

1Li$_2$O · 1Al$_2$O$_3$ · 2SiO$_2$ for a total oxide content of 53 g./l.

Preparation of coatings

A slip of cover glass was withdrawn from a solution containing approximately 53 g. total oxide per liter, at a rate of 27 cm./min., into the ambient (moist) atmosphere, and the coating was fired at 600° C. for 15 minutes.

Properties of the coating

The coating is transparent, brass scriber-proof and almost steel scriber-proof.

Preparation of granular material

The solution containing about 53 g. total oxide per liter was let dry in ambient (moist) air and then heated at a rate of about 40° C./min. to a maximum of 600° C. The lumps obtained are hard and brittle. X-ray study showed the crystal content to be 40±15%; h-eucryptite, crystals approx. 200 A.

EXAMPLE 5—GLASS CERAMIC

Preparation of the solution

The following were placed successively in a three-necked flask provided with stirrer and reflux condenser, with stirring and flooding with nitrogen:

100 ml. ethanol (dry)
2.8 g. acetyl acetone
10.4 g. Al (0 sec C$_4$H$_9$)$_3$.

The mixture was refluxed for 5 minutes and then the following was added:

15.6 g. $Si(OCH_3)_4$
0.3 ml. $NaOCH_3$ solution (sol. in $CH_3OH$, corresponding to 172 g. of $Na_2O$ per liter)
0.6 ml. $Zr(OC_3H_7)_4$ solution (sol. in $C_3H_7OH$, corresponding to 290 g. of $ZrO_2$ per liter)
1.1 g. $Ti(OC_4H_9)_4$
0.7 g. ($P_2O_5$ dissolved in 10 ml. ethanol)
6.6 ml. $LiOC_2H_5$ solution (sol. in $C_2H_5OH$, corresponding to 57.8 g. $Li_2O$ per liter)
8.6 ml. $Mg(OCH_3)_2$ solution (sol. in $CH_3OH$, corresponding to 16.3 g. MgO per liter).

The solution has a pale yellow color and has a limited stability; it contains the oxides in the following concentration:

|  | Percent |
|---|---|
| $SiO_2$ | 61.4 |
| $Al_2O_3$ | 21.6 |
| $P_2O_5$ | 6.8 |
| $Li_2O$ | 3.8 |
| MgO | 1.4 |
| $Na_2O$ | 0.5 |
| $TiO_2$ | 2.6 |
| $ZrO_2$ | 1.9 |

The total oxide content of the solution is 77 g./l.

Preparation of coatings

Coatings were applied to Supremax glass from a solution containing 77 g. total oxide per liter, at a withdrawal rate of 27 cm. per minute into the ambient (moist) atmosphere and where fired on at 580° C. for 30 minutes. The coatings are hard, transparent and shiny.

Preparation of Granular Material

On account of the difficulty of detecting crystalline phases in thin coatings, lumps were prepared by hydrolyzing the solution with simultaneous evaporation of the solvent in the air, forming a gel as in the other examples, supra, followed by gradual heating (rate of about 20° C./min.) to 620° C., and held at 620° C. for 5 hr. Clear, transparent lumps are thus formed, along with a small amount of black lumps, probably due to carbonization of parts of the mixture which had not been completely hydrolyzed before the high temperatures were applied The clear lumps had no crystalline content. Following the temperature program used for the entirely similar glass ceramic that is prepared from molten material, the clear lumps were heated at a rate of 120° C./h. to 680° C., kept at that heat for 2 h., then heated at 60° C./h. to 830° C., kept at that heat for 3 h., and finally cooled. Just as in the case of the fused glass ceramic (melting conditions 1600° C., cooling 680° C.), h-quartz solid solutions and nuclear phases containing zirconia were formed. The crystallization properties were the same as those of fused glass ceramic.

EXAMPLE 6—GLASS CERAMIC

Preparation of the solution

The following were placed successively in a three-necked flask provided with stirrer and reflux condenser, with stirring and flooding with nitrogen:

(a)

100 ml. ethanol (dry)
15.7 g. $Si(OCH_3)_4$
2.8 g. acetyl acetone
10.5 g. $Al(OC_4H_9)_3$ This solution was then refluxed for 5 minutes, and then the following were added:

4.9 ml. $LiOC_2H_5$ solution (sol. in $C_2H_5OH$, corresp. to 57.8 g. $Li_2O/l$.)

0.2 ml. $KOC_2H_5$ solution (sol. in $C_2H_5OH$, corresp. to 221 g. $K_2O/l$.)
0.7 ml. $Ca(OC_2H_5)_2$ solution (sol. in $C_2H_5OH$, corr. to 49.2 g. CaO/l.)
1.1 ml. $Ba(OC_2H_5)_2$ solution (sol. in $C_2H_5OH$, corr. to 142.5 g. BaO/l.)
31.8 ml. zinc acetyl acetonate solution (sol. in $C_2H_5OH$, with the addition of 2% acetyl acetone, corr. to 19.2 g. ZnO/l.)
0.8 g. $Ti(OC_4H_9)_4$
0.6 ml. $Zr(O-i-C_3H_7)_4$ solution (sol. in isopropanol, corr. to 290 grams $ZrO_2$ per liter)
3.8 ml. $Mg(OCH_3)_2$ solution (sol. in $CH_3OH$, corr. to 29.4 g. MgO/l.).

The solution has a pale yellow color and limited stability. It contains the oxides in the following concentrations:

|  | Percent |
|---|---|
| $SiO_2$ | 62.00 |
| $Al_2O_3$ | 21.85 |
| ZnO | 6.16 |
| $Li_2O$ | 2.82 |
| $TiO_2$ | 1.77 |
| $ZrO_2$ | 1.77 |
| BaO | 1.61 |
| MgO | 1.11 |
| CaO | 0.50 |
| $K_2O$ | 0.40 |

The total oxide content of the solution is 57.9 g./l.

(b)

Precisely the same solution was prepared, with the omission of the nucleating agents $TiO_2$ and $ZrO_2$.

Preparation of coatings

Thin, transparent coatings were obtained by drawing out of dilute solutions (10 g. total oxide per liter in the case of Solution (a) and 40 g. total oxide per liter in the case of Solution (b)), into the ambient (moist) air, followed by heating at 630° C. for 15 minutes.

Preparation of lumps

On account of the difficulty of detecting crystalline phases in thin coatings, lumps were prepared by hydrolyzing the solution with simultaneous evaporation of the solvent in air, followed by gradual heating to 530° C. for (a) and 620° C. for (b) and holding at said temperatures for, respectively, about 20 hours and about 16 hours. Some of the lumps that formed were dark brown, probably due to the carbonation of portions whose hydrolysis was not complete before high temperatures were reached.

The differential thermoanalysis performed on both types showed a crystallization peak in the case of glass ceramic (a) containing the nucleating agents $TiO_2$ and $ZrO_2$, and no crystallization peak in the case of glass ceramic (b) in which the nucleating agents were lacking.

EXAMPLE 7—SILICATE GLASS WITH HIGH ALKALI CONTENT

Preparation of the solution

The following were placed successively in a three-necked flask provided with stirrer and reflux condenser, with stirring and flooding with nitrogen:

300.0 g. ethanol (dry)
28.9 g. $Al(OC_4H_9)_3$
2.0 g. acetyl acetone

The mixture was then refluxed until it was clear, and then the following were added:

121.5 g. $Si(OCH_3)_4$ in 120 ml. ethanol
31.5 ml. $NaOCH_3$ solution (solution in $CH_3OH$, corresponding to 172 g. $Na_2O$ per liter).

The solution is reddish brown and stable; it contains the oxides in the following concentration:

| | Percent |
|---|---|
| $SiO_2$ | 80 |
| $Na_2O$ | 10 |
| $Al_2O_3$ | 10 |

The total oxide content of the solution was 80 g./l.

Coatings were applied to glass supports which were drawn from a solution of 10 g. total oxide per liter, at a rate of 5 cm./min. into the ambient air, and these became glassy clear after heating at 500° C. for about 15 minutes.

EXAMPLE 8—MAGNESIUM ALUMINUM SPINEL

Preparation of the solution

The following are successively placed in a two-necked flask provided with a stirrer:

250 ml. of i-propanol
147 g. of Al (0 sec. $C_4H_9)_3$
30 ml. of acetyl acetone

The mixture is stirred until the Al(0 sec. $C_4H_9)_3$ has clearly gone into solution. Then the following is added:

300 ml. of ethanol (99.9% pure)
345 ml. $Mg(OCH_3)_2$ solution (sol. in methanol, corresponding to 35.2 g. of MgO/l.)

The clear solution obtained has a pale yellow color. It contains the oxides in the following molar ratio: 1 MgO·1 $Al_2O_3$, at a total oxide content of 38 g./l.

Preparation of thin coatings

The solution is diluted to 30 g. total oxide per liter with ethanol. A cover glass slip is immersed and withdrawn at a uniform rate of 5 cm./min. into the ambient (moist) air. Then the coating is baked at 500° C. for 30 minutes.

Properties of the coating

The coating is transparent and steel scriber-proof.

Preparation of granular material

The solution containing 38 g. total oxide per liter is allowed to hydrolyze in air for 3 days in a beaker. The lumps that form are heated to 250° C. in 4 hours and kept at that temperature for another 4 h. Then they are heated from 250° C. to 530° C. in about 1 hr. and heated 4 hrs. at 530° C., and then heated from 530° C. to 620° C. in about 1 hr. and heated at 620° C. for 16 hrs.

Clear, bright lumps are obtained. X-ray analysis indicated spinel with a crystal size of about 100 A.

It is impossible by known methods to make spinels from $Mg(NO_3)_2 \cdot 6H_2O$ and $NH_4Al(SO_4)_2 \cdot 12H_2O$ at temperatures below 850° C.

EXAMPLE FOR COMPARISON 45.3 g. $NH_4Al(SO_4)_2 \cdot 12H_2O$
25.6 g. $Mg(NO_3)_2 \cdot 6H_2O$ were melted in a porcelain dish in their own water of crystallization and stirred to form a homogeneous liquid. During the heating, first the water of crystallization escapes, and later nitrous gases and $SO_3$ are yielded. After 2 hours of heat treatment at 620° C., no spinel can be detected by X-rays in the white powder. Not until after heating at 850° C. for 24 hrs. do the mixed oxides turn partially into spinel.

What is claimed is:

1. Process for making a glass, multi-component substance, without going through a molten phase, which comprises:
   (a) dissolving in an organic solvent as a first component at least one of alkali metal alkoxides, and alkali earth metal alkoxides, and as a second component at least one of metal compounds of Groups I–B, II–B, III, IV, V, VI, VII–A or VIII of the periodic system, maintaining the solution at a temperature and for a time for reaction of said first component with said second component, and formation of a solution containing the reaction product, the proportion of the metal compounds in said organic solution corresponding to the composition of the glass,
   (b) evaporating solvent in the presence of moisture, to obtain said reaction product in hydrolyzed, gel form, and
   (c) heating said reaction product in, hydrolyzed, gel form at a temperature in or below the transformation range for a time sufficient to convert said reaction product to said glass, multi-component substance,
   (d) the proportion of the individual components dissolved in the organic solvent being such that the composition of the glass produced is in the glassy region of the multi-component system involved.

2. Process according to claim 1, said heating of the reaction product being at a temperature no higher than the temperature of the transformation range.

3. Process according to claim 1, the second component including $H_3BO_3$.

4. Process according to claim 1, the second component including $H_3BO_3$ or $B_2O_3$, phosphorus pentoxide, arsenic pentoxide or a mixture thereof.

5. Process according to claim 1, and including in the organic solvent a stabilizer.

6. Process according to claim 5, wherein the stabilizer is acetyl acetone or triethanolamine.

7. Process according to claim 1, component being alkoxide or ester.

8. Process according to claim 1, said first component being at least one of alkoxides of lithium, sodium, and potassium, said second component being at least one of compounds of magnesium, boron, titanium, silicon, phosphorus, aluminum, zirconium, lead, zinc, and arsonic.

9. Process according to claim 8, said second component being alkoxide or ester.

10. Process according to claim 1, said second component being alkoxide.

11. Process according to claim 9, said second compound being alkoxide.

12. Process according to claim 1, said first component being at least one of alkoxides of lithium, sodium and potassium, said second component being at least one of $P_2O_5$, $As_2O_3$ and $H_3BO_4$.

13. Process according to claim 1, the organic solvent being an alcohol, ketone or ester.

14. Process according to claim 1, the organic solvent being an alcohol.

15. Process according to claim 7, the organic solvent being an alcohol.

16. Process according to claim 8, the organic solvent being an alcohol.

17. Process according to claim 12, the organic solvent being an alcohol.

18. Process according to claim 1, said solution containing said components calculated as oxides, as follows:

| | Percent |
|---|---|
| $B_2O_3$ | 12.7 |
| $SiO_2$ | 80.6 |
| $Na_2O$ | 3.6 |
| $Al_2O_3$ | 2.2 |
| $K_2O$ | 0.6 |

19. Process according to claim 1, said solution containing said components calculated as oxides, as follows:

| | Percent |
|---|---|
| $SiO_2$ | 60.0 |
| $Al_2O_3$ | 25.2 |
| $MgO$ | 0.02 |
| $P_2O_5$ | 9.0 |
| $B_2O_3$ | 2.6 |
| $CaO$ | 0.78 |
| $BaO$ | 2.3 |
| $As_2O_3$ | 0.10 |

20. Process according to claim 1, said solution containing said components calculated as oxides, as follows:

| | Percent |
|---|---|
| $SiO_2$ | 62 |
| $PbO$ | 30 |
| $Na_2O$ | 8 |

21. Process according to claim 1, said solution containing said components calculated as oxides, as follows:

| | Percent |
|---|---|
| $SiO_2$ | 80 |
| $Na_2O$ | 10 |
| $Al_2O_3$ | 10 |

22. Process according to claim 1, wherein the multi-component substance produced in step (c) is in the form of granules.

23. Process according to claim 22, and heating the granules of multi-component substance to transform them to the plastic state and pressing the granules while in said state to mold a shaped body therefrom.

24. Process according to claim 23, wherein the granules are heated to a temperature in the transformation range to transform them into the plastic state.

25. Process according to claim 1, and including a nucleating agent in the organic solvent and heating said glass to form a glass ceramic.

References Cited

UNITED STATES PATENTS

| | | | |
|---|---|---|---|
| 3,640,093 | 2/1972 | Levene | 65—134 X |
| 3,332,490 | 7/1967 | Burtch et al. | 65—33 X |
| 3,244,639 | 4/1966 | Mindick et al. | 106—50 X |
| 3,311,481 | 3/1967 | Sterry et al. | 106—50 X |
| 2,908,545 | 10/1959 | Teja | 106—50 UX |

FOREIGN PATENTS

| | | | |
|---|---|---|---|
| 1,286,038 | 1/1969 | Germany | 106—39 R |

OTHER REFERENCES

Handbook of Glass Manufacture, vol. II, by Fay V. Tooley, pp. 192 to 199.

FRANK W. MIGA, Primary Examiner

U.S. Cl. X.R.

65—32, 33, 52, Dig. 14; 106—39 R, 50, 308 Q

UNITED STATES PATENT OFFICE
CERTIFICATE OF CORRECTION

Patent No. 3,759,683         Dated September 18, 1973

Inventor(s) Helmut Dislich, Paul Hinz, and Reinhard Kaufmann

It is certified that error appears in the above-identified patent and that said Letters Patent are hereby corrected as shown below:

1. Col. 5, line 43 "15" should be --5--.

2. Col. 6, line 71 "Percent" should be --g--.

Signed and sealed this 21st day of May 1974.

(SEAL)
Attest:

EDWARD M. FLETCHER, JR.
Attesting Officer

C. MARSHALL DANN
Commissioner of Patents